455-619 AU 233 EX
FIP8106 XR 3,465,101

INVENTORS
Hugh S. Christian
Dale R. Lowe
Charles J. Ulrick
Charles P. Womock
BY Moody and Phillips
Attorneys INVENTORS
Hugh S. Christian
Dale R. Lowe
Charles J. Ulrick
Charles P. Womack
BY
Moody and Phillips
Attorneys INVENTORS
Hugh S. Christian
Dale R. Lowe
Charles J. Ulrick
Charles P. Womack
BY Moody and Phillion
Attorneys

United States Patent Office 3,465,101
Patented Sept. 2, 1969

3,465,101

HIGH SPEED INTER-COMPUTER COMMUNICATION USING NARROW BANDWIDTH TWISTED PAIR CABLE

Hugh S. Christian, Lafayette, Ind., Dale R. Lowe, Milwaukee, Wis., and Charles J. Ulrick and Charles P. Womack, Marion, Iowa, assignors to Collins Radio Company, Cedar Rapids, Iowa, a corporation of Iowa Filed Apr. 18, 1966, Ser. No. 543,157
Int. Cl. H04l *15/04, 15/24*
U.S. Cl. 178—68 6 Claims

ABSTRACT OF THE DISCLOSURE

A means for transmitting and receiving a two-level data signal and comprising transmitter means for creating a short duration positive pulse for each positive transition of the two-level signal and a short negative pulse for each negative transition thereof. A transformer means has its primary center-tapped to ground with the two end terminals connected to receive the short duration positive and negative pulses respectively. The two end terminals of the secondary are connected, one each to a pair of twisted wires. At the receiver at the other ends of the twisted wires are transformer-coupled to appropriate reshaping and detecting circuits.

This invention relates generally to the transmission of encoded intelligence and, more particularly, to a system for effectively transmitting high bit rate data from one data processing equipment to another data processing equipment over distances up to several thousand feet.

In present day data processing installations the complexity and size of the equipment requires the use of processors which may be located generally in the same area but spaced apart distances ranging from a few feet up to, in extreme cases, a few thousand feet. Since these data processors work together as a unit, it is necessary to transmit data from one to another. One means of transmitting such data is the straightforward means of supplying the two-level data logic signal directly to a transmission line, such as a coaxial cable, connecting the two equipments together. It has been found, however, that such a technique has some disadvantages. These disadvantages are, specifically, a rather high attenuation and a degradation of the signal. Such loss and degradation are of such a magnitude that this means of transmitting data is effective only up to about one houndred feet.

Another approach is to modulate the two-level data signal by a high frequency carrier and then transmit the modulated signal through appropriate means, such as a coaxial cable. Such a system, however, has the disadvantage of relative complexity and corresponding expense.

It would mark an improvement in the art to provide some simple, reliable, and inexpensive means for transmitting data between various portions of a large data processing system up to distances of several thousand feet.

Accordingly, it is a primary object of the invention to provide an efficient and reliable means for transmitting data over distances up to several thousand feet at a bit rate of the order of 2 to 5 megabits per second.

A second aim of the invention is to provide a simple and relatively inexpensive transmitting means for transmitting data over short distances between various data processors of a large system at a bit rate of the order of 2 to 5 megabits per second.

A third object of the invention is to provide a simple, reliable, and effective means for transmitting data, in which a two-level data signal is represented, for purposes of transmission, by a series of bipolar pulses, with pulses of one polarity representing positive transitions of a two-level signal and pulses of the other polarity representing negative transitions, and in which the transmission medium is a pair of twisted wires.

A fourth purpose of the invention is a simple and inexpensive means for transmitting data, in which a two-level binary data signal is represented by bipolar pulses, with pulses of unlike polarity representing positive and negative transitions of a two-level signal, and in which the transmission medium is a pair of twisted wires connected to balanced circuits at both the transmitter and the receiver.

Another object of the invention is the improvement of means for transmitting data bits, generally.

In accordance with the invention, differentiating means are provided at the transmitter station to convert the two-level data signal into bipolar pulses, with a pulse of a first polarity representing the leading edge of a data bit and a pulse of the other polarity representing the trailing negative transition of the two-level signal. For discussion purposes, assume the first polarity to be positive and the said other polarity to be negative.

After amplification of the bipolar pulses, such pulses are supplied, by impedance terminating means, directly to a transmission cable, which in a preferred form of the invention is a twisted pair of wires. The aforementioned impedance terminating means can be either balanced or unbalanced, depending on circuit requirements and are employed both at the transmitting and receiving end of the system. At the receiver, means are provided to amplify and reshape the pulses. The reshaped pulses are then supplied to a suitable flip-flop type circuit, such as tunnel diode circuit, which functions to reconvert the pulses from a series of bipolar pulses into a two-level data signal. If necessary, further amplifications are then provided to boost the signal strength to a desired level.

In accordance with the feature of the invention, the use of the bipolar pulses, which is basically an AC signal, permits the use of line balancing transformers as the impedance terminating means, and the transmission of comparatively narrow bipolar pulses.

In accordance with another feature of the invention, diodes are provided in the receiver at a point just preceding the tunnel diode flip-flop circuit to act as voltage threshold devices; thereby providing a noise threshold level which substantially enhances the reliability of operation of the system.

The above-mentioned and other objects and features of the invention will be more fully understood from the following detailed description thereof when read in conjunction with the drawings in which.

It is to be noted that in the various figures, components or blocks which have corresponding components or blocks in other figures, are represented by the same reference character, although primed.

Figure 1:
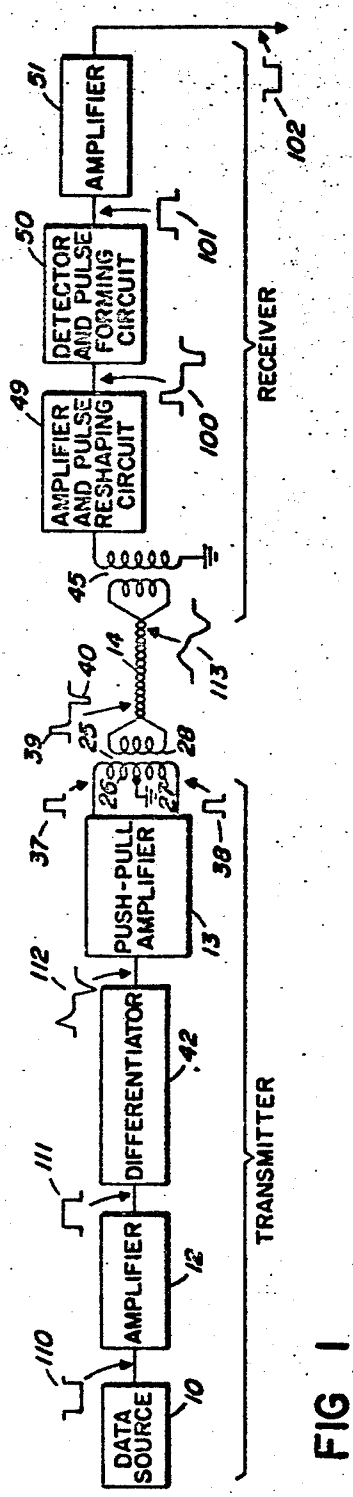
FIG. 1 is a combination block diagram and schematic diagram of the overall system.

Referring now to FIG. 1, the data source 10, which may be a register in a data processor, functions to supply data under suitable addressing and gating means, not shown, to amplifier 12. The amplifier 12 raises the level of the received data to a desired level and then supplies such data signals to differentiator 42.

Differentiator 42 functions in a standard manner to produce a positive pulse for each positive transmission of a two-level data signal and a negative pulse for each negative transition of a two-level data signal. Such positive and negative pulses, which are herein defined as a bipolar pulse arrangement, are supplied to push-pull amplifier circuit 13, which functions to supply the positive pulses, such as pulse 37, to the upper terminal of portion 26 of the tapped primary winding of transformer 25. The negative pulses supplied to push-pull amplifier 13 are inverted therein and then supplied as positive pulses to the lower terminal of portion 27 of the primary winding of transformer 25. Such inverted negative pulses are represented by pulse 38 in FIG. 1. The primary half-winding portions 26 and 27 are wound in such a way as to generate, respectively, positive and negative pulses in secondary winding 28. More specifically, the pulse 37 functions to generate a positive pulse, such as pulse 39, at the top terminal of secondary winding 28. On the other hand, the positive pulse 38, supplied to the primary half winding 27 generates a negative pulse, such as pulse 40, at the upper terminal of secondary winding 28. Thus, the two pulses 39 and 40 represent the positive transition and the negative transition of a two-level signal which, for example, could be a binary bit 1. Such two pulses 39 and 40 are then supplied through the twisted pair of cable 14 to a receiver. The twisted pair cable 14 can be any length of from a few feet up to several thousand feet and can be of narrow bandwidth.

At the receiver the twisted pair cable is connected across the primary winding of transformer 45, thus forming a balanced impedance circuit over the entire length of the twisted pair cable. The secondary of transformer 25 is grounded at one terminal with the other terminal supplying the signal to an amplifying and pulse reshaping circuit 49 to produce a waveform 100 at the output thereof. The signal 100 is then supplied to the detector and pulse forming circuit 50 which functions to respond to the two pulses of waveform 100 to produce the two-level waveform 101 at the output thereof. Amplifier 51 is provided to amplify and invert the waveform 101 to the form shown in waveform 102.

Figure 2:
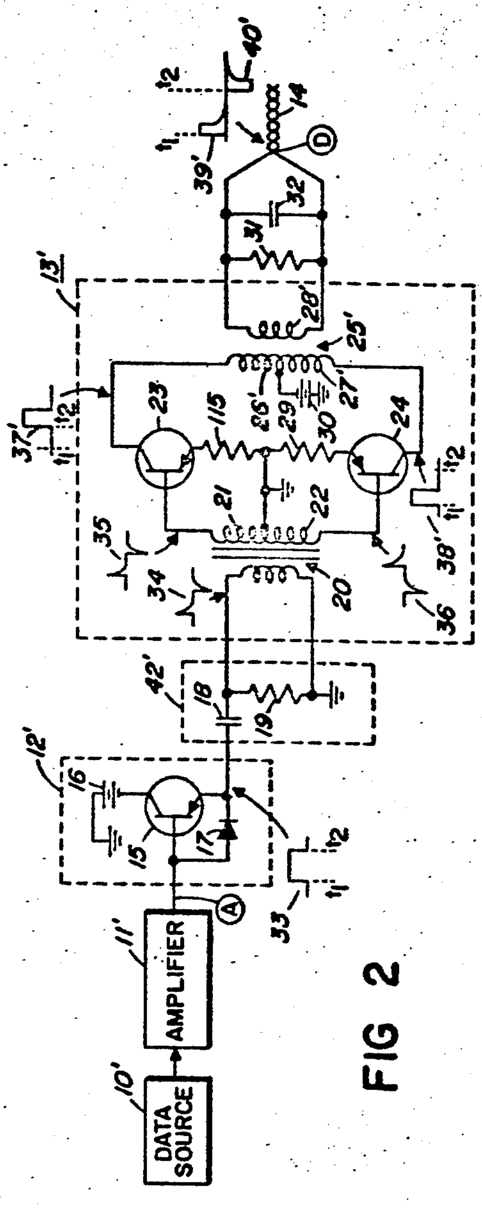
FIG. 2 is a schematic diagram of the transmitter.

Referring now to FIG. 2, there is shown a schematic diagram of the transmitter. The data source 10' supplies the data signal to amplifier 11' where the initial amplification occurs. The output of amplifier 11' is then supplied to emitter follower type amplifier 12' which has its output signal taken from the emitter electrode and supplied to push-pull amplifier 13' through a differentiating circuit consisting of capacitor 18 and resistor 19.

The amplifier 12' is comprised of transistor 15 with the collector electrode connected to battery source 16 and the base connected to the emitter through diode 17. The diode 17 aids in keeping the potential of the emitter close to that of the base electrode of transistor 15.

The two-level signal appearing at the emitter of transistor 15 is identified by reference character 33 and has a positive transition at time $t_1$ and a negative transition at time $t_2$. The differentiating circuit (capacitor 18 and resistor 19) responds to the waveform 33 to produce the waveform 34 across the primary winding of transformer 20. The secondary winding of transformer 20 is center tapped to ground with the upper half portion 21 thereof being connected to the base of transistor 23 and the lower portion 22 thereof being connected to the base of transistor 24.

The circuit within the block 13' is a push-pull type circuit with the emitter electrodes of both transistors 23 and 24 being connected to ground through resistors 115 and 29, respectively. The collector current of transistors 23 and 24 flow through the upper and lower half portions 26' and 27', respectively, of the primary of transformer 25', which primary winding is center tapped to negative battery source 30.

As indicated in connection with the circuit of FIG. 1, the upper and lower portions 26' and 27' of primary of transformer primary 25' are wound to produce positive and negative pulses, respectively, in secondary winding 28'. Note that pulses 39' and 40' are derived, respectively, from pulses 37' and 38'. Resistor 31 and capacitor 32 form a filter circuit in the output across the secondary winding of transformer 25'.

The signal induced in secondary winding 28' is supplied to twisted pair cable 14'. Such cable 14' is connected at its other end to the primary of transformer 45' of the receiver shown in FIG. 4. It will be noted that the primary of transformer 45' presents a balanced impedance to the twisted pair cable 14''. The secondary winding of transformer 45' which is shunted by resistor 47 supplies the received signal to the base of transistor 54 which forms a part of amplifier 48'. The output of amplifier 48' is taken from the collector of transistor 54 and supplied to the base of transistor 61, which is part of a second amplifying means 49'.

The two amplifiers 48' and 49' have a negative feedback connection therebetween extending from the collector of transistor 61 to the emitter of transistor 54 and comprising capacitor 59 and resistor 60 in series arrangement. The use of the two amplifiers 48' and 49' with the negative feedback arrangement is to insure controlled voltage amplification. The gain of only a single amplifier would depend upon the beta of the transistor; which beta characteristic varies with temperature to produce undesirable variations in amplification. With the use of two amplifiers and the negative feedback arrangement, however, any change in beta characteristic tends to increase the voltage output at the collector of transistor 61 and will cause a corresponding increase in the emitter voltage of transistor 54, with a subsequent decrease in gain of transistor 54, since it is an NPN type transistor.

The overall function of amplifiers 48' and 49' is to amplify the attentuated received signal 113' and then to clip the amplified signal to reproduce the two relatively sharp pulses as represented by the waveform 100'. The signal 100' is then passed through coupling capacitor 68 and current limiting resistor 69 to the parallel combination of diodes 70 and 71.

The diodes 70 or 71 will pass voltages of any polarity as long as such voltages exceed internal potential drop of the diodes and the potential of the cathode of tunnel diode 77. Thus diodes 70 and 71 function as voltage threshold devices and thereby eliminate much of the noise that accompany the incoming data signal. The elimination of such noise with a corresponding improvement of signal-to-noise ratio is important since the tunnel diode 77 is rather sensitive and could be triggered by noise impulses, in the absence of the action of diodes 70 and 71.

Figures 4, 5:
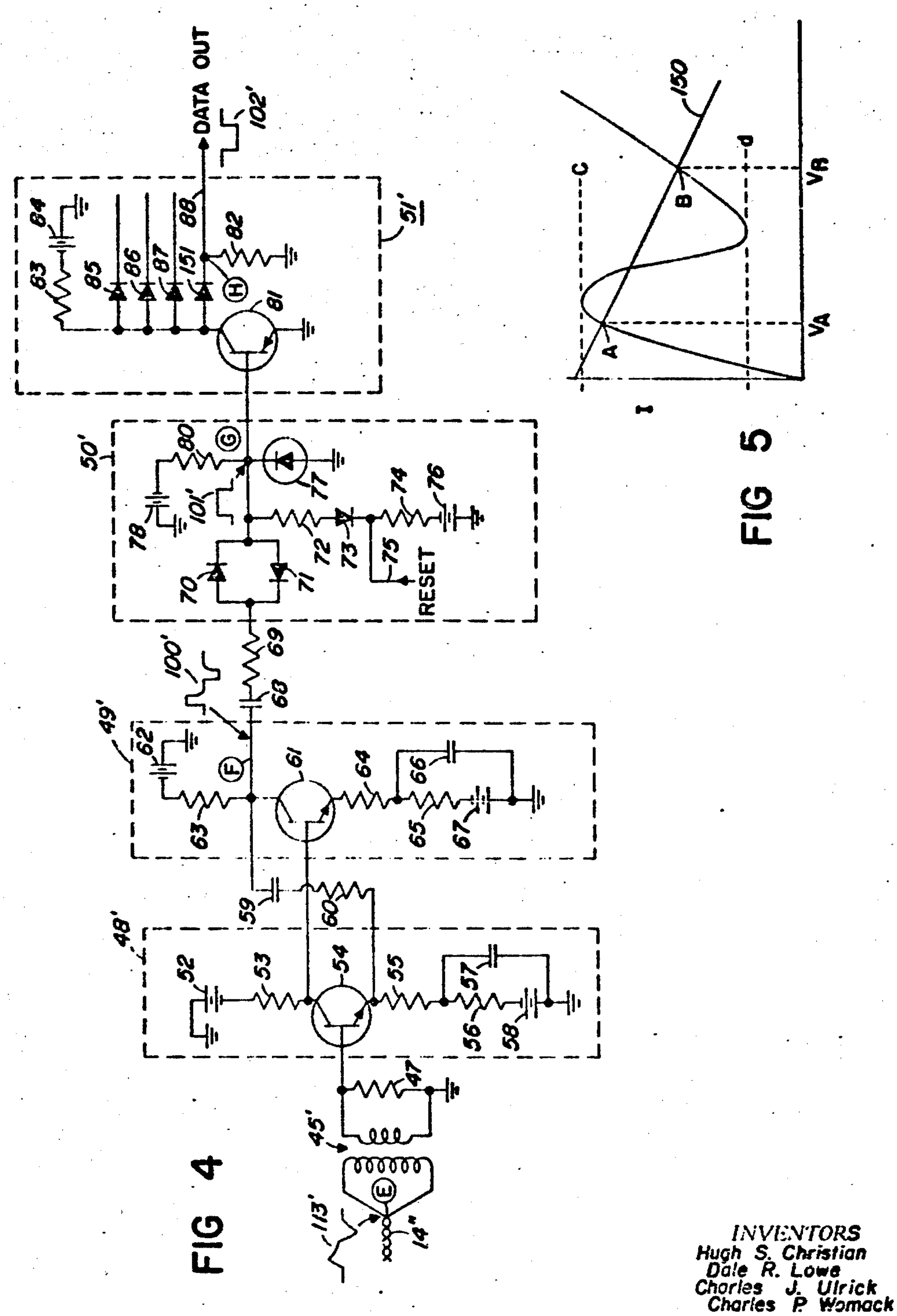
FIG. 4 is a schematic diagram of the receiver.
FIG. 5 is a voltage vs. current response and is a characteristic operating curve of a tunnel diode.

Referring now to FIG. 5 there is shown the operating characteristic of tunnel diode 77. In FIG. 5 the tunnel diode can be seen to have two stable states identified as points A and B. When transferring from point A to point B the diode must rise above the level C as the applied voltage is increased. The current will then decrease rapidly through the negative resistance region and will finally settle at point B which is determined by the load line 150. In going from state B to state A the reverse is true in that as the voltage applied is decreased the current through the tunnel diode will follow the operating characteristic until it reaches the negative resistance portion at which time it will flip over to point A. The level represented by the line D represents the threshold value which must be exceeded in changing from state B to state A.

Returning again to a discussion of FIG. 4, the output signal appearing at the cathode of tunnel diode 77 is a two-level signal, as indicated by the waveform 101' in FIG. 4. This signal is supplied to the base of transistor 81, which forms the main component of amplifier 51'. The collector of transistor 81 is connected to negative battery 84 through resistor 83.

Several outputs can be taken from the collector of transistor 81. One such output is represented by lead 88 which is connected to the collector of transistor 81 through diode 151, with load resistor 82 being connected to ground. The three diodes 85, 86, and 87 represent other output means which can be supplied to other suitable loads.

Figure 3:
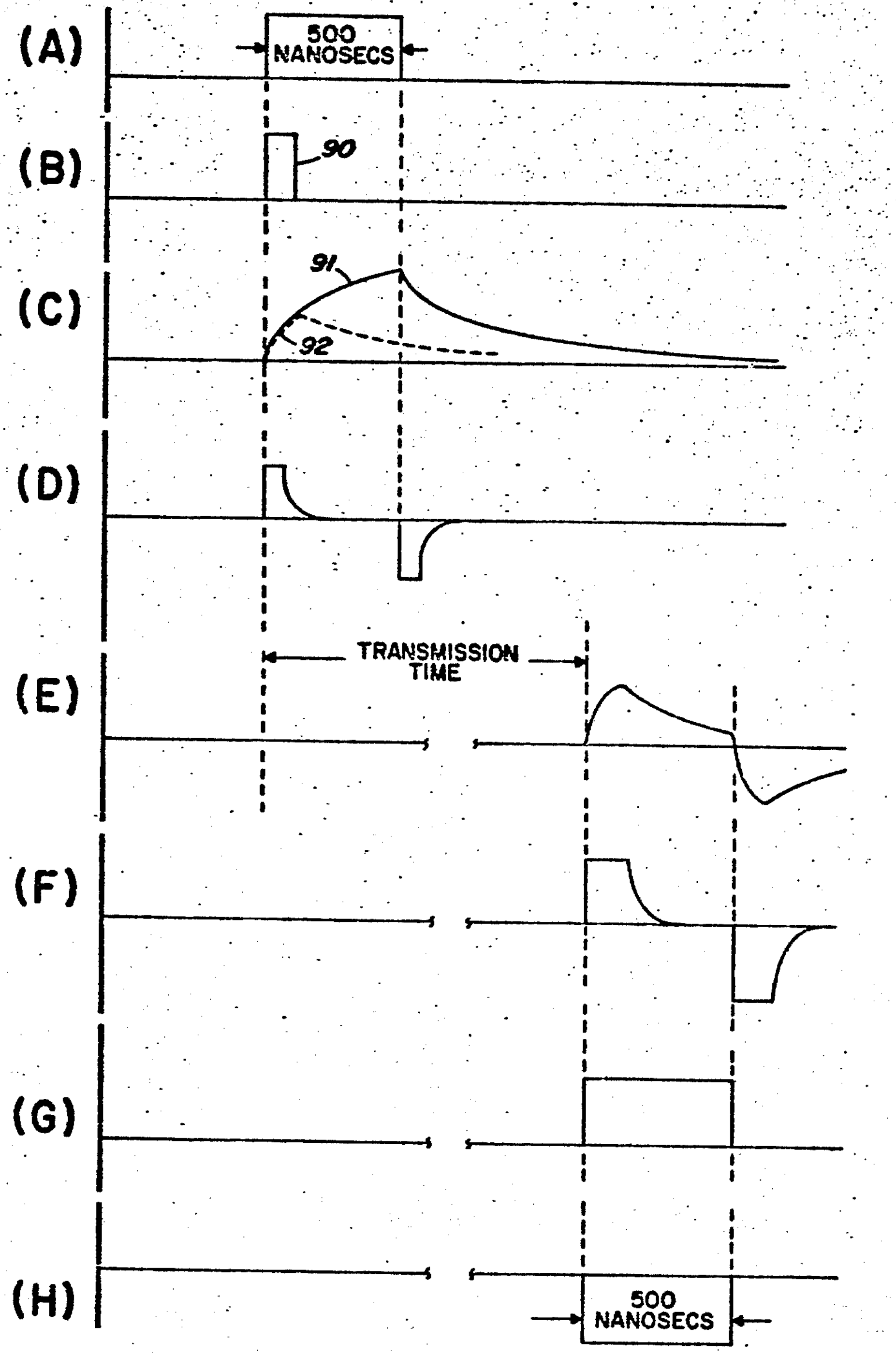
FIG. 3 is a set of waveforms showing the voltages generated at various points in the transmitter of FIG. 2 and also in the receiver of FIG. 4.

Referring now to FIG. 3, there are shown waveforms of signals appearing at various points in the system. The waveforms of FIG. 3 are sub-labeled A through H and will be so identified on the schematic diagrams of FIGS. 2 and 4.

In the transmitter of FIG. 2, waveform A is shown as occurring at the output of amplifier 11'. Waveform D is shown as occuring at the output of the transmitter and represents the signal supplied to the twisted pair cable 14'.

In the receiver of FIG. 4 the signal received at transformed 45' is represented by waveform E, which signal is delayed by the transmission time of the twisted cable of 14''. Such waveform is amplified and reshaped into the form of FIG. 3F which is shown at the output of amplifier 49'.

The tunnel diode functions to transform the waveform of FIG. 3F into that shown by FIG. 3G which is a two-level signal. Amplifier 51 amplifies and inverts the waveform of FIG. 3G into that of FIG. 3H.

The solid line waveform 91 of FIG. 3C represents the build-up of charge in the capacitance of a transmission line when a pulse, such as the pulse of FIG. 3A, is supplied to the transmission line. The dotted waveform 92 of FIG. 3C represents the build up of electrical charge when a narrower pulse, such as the pulse 90 of FIG. 3B, is supplied to the transmission line. Both the waveform 91 and the waveform 92, of course, exhibit a decay in the electrical charge upon the termination of the applied pulse.

The pulse 90 of FIG. 3B represents a bipolar pulse of the present invention and it can be seen to cause an accumulation of much less electrical charge in the transmission line than is caused by the longer pulse of FIG. 3A. The importance of a smaller accumulation of charge along the transmission line is as follows. It is desirable that the transmission line return as nearly as possible to a nonchanged condition before another input pulse is supplied thereto. Otherwise, the signal-to-noise ratio of the transmitted pulse is decreased. It is apparent from FIG. 3C that the charge accumulated in a transmission line due to the long pulse of FIG. 3A requires a much greater time to decay to a given voltage level than when a narrower pulse, such as pulse 90 of FIG. 3B, is supplied to the transmission line.

It is to be noted that the form of the invention shown and described herein is but a preferred embodiment thereof and that many changes may be made therein without departing from the spirit or scope of the invention.

We claim:

1. A bipolar transmission system for transmitting two-level signals and comprising a transmitter means, a receiver means, and a transmission medium comprising a pair of twisted wires extending from said transmitter means to said receiver means; said transmitter means comprising:

means for converting all positive-going transitions of said two-level signal to short-duration pulses of a first polarity;

means for converting all negative-going transitions of said two-level signal to short-duration pulses of a second polarity to complete the bipolar encoding of said two-level signal;

means comprising first and second output means and responsive to said short duration pulses of said first and second polarity to produce on said first output means a first train of pulses which correspond in time to said short duration pulses of said first polarity and a second train of pulses on said second output means which correspond in time to said short duration pulses of said second polarity; and transformer means comprising center-tapped primary winding means and secondary winding means;

said center-tapped primary winding comprising first and second terminals which are constructed to receive said first and second trains of pulses, respectively, to induce in said second winding means a pulse of a first polarity in response to each pulse of said first train of pulses and a pulse of a second polarity for each pulse of said second train of pulses;

said secondary winding comprising two terminals each of which is connected to an alternate one of the two wires of said pair of twisted wires; and impedance means for connecting the other ends of the twisted wires to said receiver means and constructed to present a balanced impedance to said pair of twisted wires.

2. A bipolar transmission system in accordance with claim 1 in which said impedance means comprises a transformer means with the primary winding thereof having each of its two end terminals connected to alternate ones of the two wires of said twisted pair of wires and having a secondary winding thereof connected to said receiver means.

3. A bipolar transmission system in accordance with claim 1 in which said receiver means comprises means for detecting and converting said bipolar pulses to a two-level signal which is substantially a reproduction of the two-level signal supplied to said transmitter means.

4. A bipolar transmission system in accordance with claim 1 in which said receiver means comprises a bistable element responsive to the bipolar pulses of said first and second polarities to change to its first and second states, respectively;

said bistable element having the characteristics of exhibiting different impedances in said first and second states;

voltage source means for applying a voltage across said bistable element to produce voltages of a first and second level depending on the impedance state of said bistable element, to reproduce the two-level signal supplied to said transmitter means.

5. A bipolar transmission system in accordance with claim 4 in which:

said receiver means comprising a pair of diodes connected in cascade with and preceding said bistable element;

said pair of diodes being connected in parallel with each other and presenting opposite polarities to the said bistable element;

said pair of diodes further being connected to supply said bipolar pulses to said bistable element;

the said pair of diodes having threshold breakdown impedances of a value sufficient to block from said bistable element a substantial portion of low-level noise accompanying said bipolar pulses supplied to said bistable element.

6. A bipolar transmission system in accordance with claim 5 in which said bistable element comprises a tunnel diode having first and second electrodes and in which said voltage source is applied across said first and second electrodes and comprises the series combination of a battery source and a resistive means with said resistive means being connected to said first electrode of said tunnel diode;

means for supplying the output of said pair of diodes to the junction between said resistive means and said first electrode of said tunnel diode.

References Cited

UNITED STATES PATENTS

| | | | |
|---|---|---|---|
| 2,995,667 | 8/1961 | Clapper et al. | |
| 3,207,913 | 9/1965 | Herzog | 307—206 X |
| 3,349,328 | 10/1967 | Hunkins et al. | 325—38 |

ROBERT L. GRIFFIN, Primary Examiner
J. A. BRODSKY, Assistant Examiner

U.S. Cl. X.R.

307—206; 325—38, 43